(No Model.)
A. L. H. MESSMER.
VEHICLE WHEEL.
No. 502,006. Patented July 25, 1893.
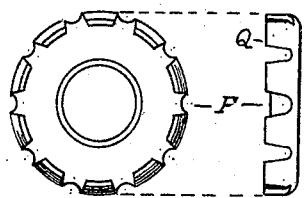
Fig. 3.
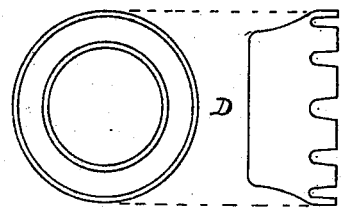
Fig. 4.
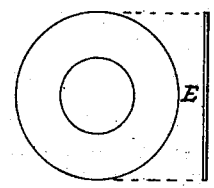
Fig. 5.
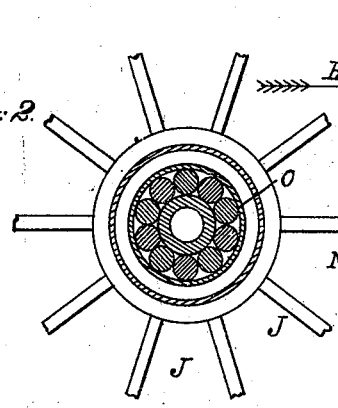
Fig. 2.
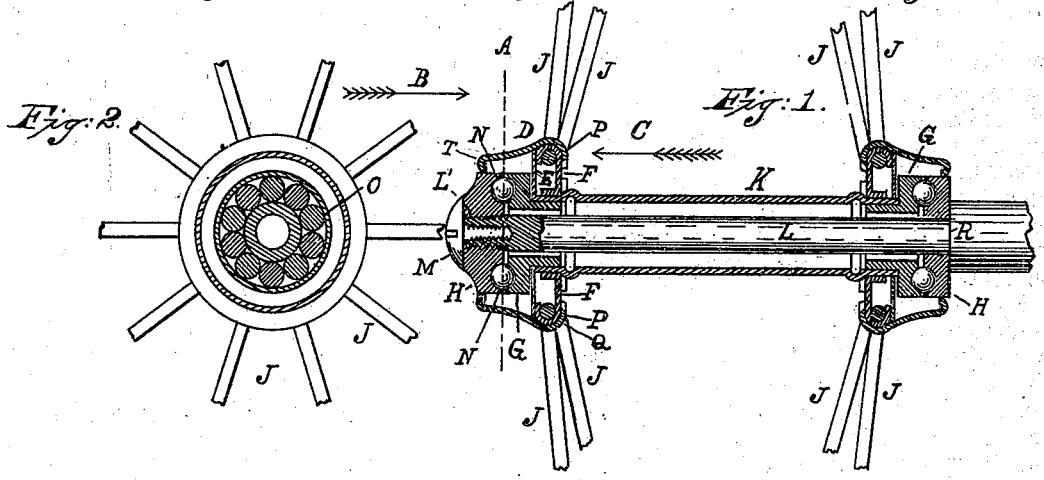
Fig. 1.
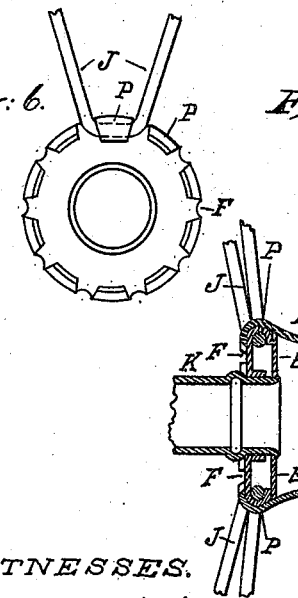
Fig. 6.    Fig. 7.
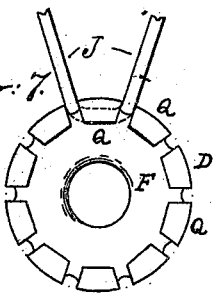
Fig. 9.
Fig. 8.
WITNESSES.
Elija A. Colburn
M. E. Bunk
INVENTOR.
Alexander Ludwig Heinrich Messmer
By Henry J. Colburn, Atty.

UNITED STATES PATENT OFFICE.

ALEXANDER LUDWIG HEINRICH MESSMER, OF GARDNER, MASSACHUSETTS, ASSIGNOR TO HEYWOOD BROS. & CO., OF SAME PLACE.

VEHICLE-WHEEL.

SPECIFICATION forming part of Letters Patent No. 502,006, dated July 25, 1893.

Application filed February 16, 1893. Serial No. 462,616. (No model.)

*To all whom it may concern:*

Be it known that I, ALEXANDER LUDWIG HEINRICH MESSMER, a citizen of the United States, residing at Gardner, in the county of Worcester and State of Massachusetts, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels of that class in which a central cylindrical box is provided at its opposite ends with means, such as will be hereinafter shown, adapted to secure to each of said extremities a set of radiating spokes, which sets of spokes as they radiate incline toward a central plane intermediate between said extremities of said central box and cutting the axial line at right angles thereto. The type of spokes which I employ and which are common to this class of wheels are made of wire each piece being bent to form two integral spokes. And the objects of my improvements are, first, to provide simple and effective means for securing such spokes in firm position; second, to secure a neat, light and symmetrical device, and as much as possible to be formed from plate metal; third, to provide such a wheel hub with ball bearings.

This invention is an improvement upon a wheel hub for which a United States patent was granted Alexander L. H. Messmer and, Charles Hermann Luthman, bearing date May 20, 1890 and numbered 428,313.

I attain my objects by the mechanism illustrated in the accompanying drawings, in which—

Figure I is a vertical section of a complete wheel hub showing spokes attached thereto and constructed with ball bearings. Fig. II is a section on a line A viewed in the direction of arrow B. Fig. III is a side elevation (in two parts) of a washer composing a part of my hub. Fig. IV is a side elevation (in two parts) of a second washer composing a part of my hub. Fig. V is a side elevation (in two parts) of a third washer composing a part of my hub. Fig. VI is a second view and a side elevation of washer shown in Fig. III having one of its notched extensions closed over a spoke bend. Fig. VII is a view of a combination of the washers shown in Figs. III and IV, illustrating a spoke bend in position between said washers and seen in the direction of arrow C. Fig. VIII is a vertical edge view of a complete and finished wheel. Fig. IX is a vertical section of one hub minus the collars H and G and H' and bearing balls O.

Similar letters refer to similar parts throughout the several views.

Referring to the drawings in Fig. I wherein is shown the complete hub in section, D is the outside casing, E a plain flat washer, F a concaved notched washer, G a flanged collar, H' a threaded collar, J spokes, two of which are preferably made integrally and united by a common bend. These parts are all assembled upon an axle box K, and adapted to rotate about an axle L which is shouldered at R to fix the collar H in position and threaded at L' to receive the collar H'. At M is a headed screw centered with and threaded into the said axle L. It is obvious that the said shoulder R and headed screw M are adapted to secure the assembled hub in longitudinal position.

At N and within the adjacent vertical sides of the collars G, H, and H' are formed concavities proper in form and size to receive the bearing balls O. This hub is assembled as follows: The notched extensions P of the washer F are turned over the spoke bends as shown in Figs. I, VI and IX when the said washer F is pressed upon the end of the axle box K. The flat washer E is then placed in position as shown in Figs. I and IX and the casing washer D (at this stage of the assembling having the form shown in Fig. IV) placed in position over the washer E and its notched projections Q turned upon the washer F as shown in Figs. I, VII and IX; thus completing the common hub, minus the ball bearing addition. The said ball bearing attachment is formed by the addition of the collars G placed in position as shown in Fig. I. Said collars being preferably formed with flanges expanding into the sand band space lying under the casing washer D and tubular extensions adapted to extend into the ends of the axle box K as shown in said Fig. I. The collar H is now placed rigidly in position upon the axle L against the shoulder R and the axle box K with its assembled hub added thereto, when the collar H' is placed in position upon the screw thread L' with balls O in concavities N and locked by means of headed screw M. It is obvious that when the said parts are thus disposed with the collars H and H' in rigid position that the axle box K and its attachments resting upon the balls O will rotate about the said axle L. The wheel having been thus far assembled is completed by closing its spokes in the ordinary manner into a rim S. When this hub is used without ball bearings the balls O collars H, H' and G are not employed, the hub being complete as shown in Fig. IX. The peculiar form of the casing washer D having the inwardly flanging rim I, curved, notched extensions P and gradually reducing diameter from end to end. The said piece being adapted to form a hub casing and a sand band combined, is a feature of my invention as set forth.

Having described my invention, what I claim as new, and desire to secure by Letters Patent, is—

1. A notched washer, a part of the notched extensions of which are closed over the uniting bend of a pair of integral spokes, a plain washer located adjacent to the ends of the said closed notched extensions, a casing washer having notched projections, closing over the periphery of the said plain washer and over the notched extensions of the said notched washer, in combination with an axle box substantially as shown.

2. An axle box provided with spoke securing washers located near the ends of said box, casing washers extending longitudinally beyond the ends of said axle box adapted to form sand bands, the said casing washers being provided with notched projections extending between spokes and closing over the peripheries of the spoke securing washers, substantially as shown.

3. A tubular axle box, means for securing spokes thereto, provided with sand band extensions, collars secured to said axle box in combination with an axle to which is secured collars adjacent to those secured to said axle box, said collars being provided with annular grooves and adapted to use balls for bearings, substantially as shown.

4. In a metal wheel hub an integral casing having longitudinal notched extensions at one extremity adapted to be inwardly turned to embrace the connecting bands of integral pairs of spokes wherein the said casing reducing in diameter in the direction of its axis terminates at its opposite extremity in an inwardly projecting flange adapted to form a sand band, substantially as shown.

In testimony whereof I have affixed my signature in presence of two witnesses.

ALEXANDER LUDWIG HEINRICH MESSMER.

Witnesses:
JULIAN P. DUNN,
THATCHER B. DUNN.